United States Patent
Bennett, Jr. et al.

(10) Patent No.: US 7,181,466 B2
(45) Date of Patent: Feb. 20, 2007

(54) METHOD AND SYSTEM FOR CREATING A STORAGE REPOSITORY FOR GRAPHICAL IMAGES ON A COMPUTER NETWORK

(75) Inventors: Carl O. Bennett, Jr., Marietta, GA (US); Flemming Boegelund, Frederikssund (DK); Bruce D. Chatman, Ho-ho-kus, NJ (US); Steven Earl Hicks, Coppel, TX (US)

(73) Assignee: International Business Machines Corporation, Armonk, NY (US)

( * ) Notice: Subject to any disclaimer, the term of this patent is extended or adjusted under 35 U.S.C. 154(b) by 997 days.

(21) Appl. No.: 10/061,417

(22) Filed: Jan. 31, 2002

(65) Prior Publication Data

US 2003/0145023 A1 Jul. 31, 2003

(51) Int. Cl.
*G06F 17/00* (2006.01)
*G06F 7/00* (2006.01)
(52) U.S. Cl. .................. 707/104.1; 707/102; 707/10
(58) Field of Classification Search ............. 707/104.1, 707/10, 102; 709/217, 204
See application file for complete search history.

(56) References Cited

U.S. PATENT DOCUMENTS

| | | | | |
|---|---|---|---|---|
| 5,973,695 A | * | 10/1999 | Walsh et al. | 715/854 |
| 5,991,798 A | * | 11/1999 | Ozaki et al. | 709/217 |
| 6,061,695 A | * | 5/2000 | Slivka et al. | 715/513 |
| 6,374,260 B1 | * | 4/2002 | Hoffert et al. | 707/104.1 |
| 6,938,039 B1 | * | 8/2005 | Bober et al. | 707/8 |
| 2002/0103864 A1 | * | 8/2002 | Rodman et al. | 709/204 |
| 2002/0109712 A1 | * | 8/2002 | Yacovone et al. | 345/732 |
| 2002/0124082 A1 | * | 9/2002 | Andres et al. | 709/225 |

FOREIGN PATENT DOCUMENTS

EP 1260915 * 11/2002

OTHER PUBLICATIONS

A Streamlined System for Building Online Presentation Archives using SMIL, James et al., ACM, ACE 2000, Dec. 2000, Melbourne, Australia. (provided previously).*
Visual Information Retrieval from Large Distributed Online Repositories, Communications of ACM, Dec. 1997/vol. 40, No. 12. (provided previously).*

* cited by examiner

*Primary Examiner*—John Cottingham
*Assistant Examiner*—Kuen S. Lu
(74) *Attorney, Agent, or Firm*—David A. Mims, Jr.; Darcell Walker

(57) ABSTRACT

A method and system creates a graphical display repository at a computer network location. The method also provides for the conversion and transfer of displays stored in a local database to the network repository. The storage method will enable graphical displays to be stored in the repository such that a user can easily navigate through the repository and maintain a knowledge of their location within the repository at all times. This method and system will also produce navigation tools, in the form of buttons that will be included on each graphical display that is shown to the user. The user will be able to select displays from a particular presentation set by selecting one of the buttons that will correspond to a set and/or a particular display.

21 Claims, 9 Drawing Sheets

METHOD AND SYSTEM FOR CREATING A STORAGE REPOSITORY FOR GRAPHICAL IMAGES ON A COMPUTER NETWORK

FIELD OF THE INVENTION

This invention relates to a method and system for creating a repository at a computer network location and storing graphical images in the created repository and in particular to a method and system for creating a slide repository at a computer network location and transferring and storing presentation slides that are stored in a local database in the created slide repository.

BACKGROUND OF THE INVENTION

Making presentations and conducting meetings are important aspects of many occupations. Executives make presentations to directors, managers conduct meetings with staff, salespersons make presentations to potential customers, doctors conduct meetings with nurses, lawyers make presentations to juries, and so on. A great many professionals conduct and attend meetings and presentations regularly. Much effort therefore goes into creating and delivering effective presentations and preparing for and conducting effective meetings.

With specialized software, conventional personal computers provide effective platforms for creating and conducting presentations and meetings. Currently available presentation program modules can turn a personal computer into a customized presentation system for creating and delivering slide presentations. Generally described, these presentation systems provide a specially designed, user-friendly, pallet of tools to assist in the creation of presentation slides to be subsequently displayed to an audience. These presentation systems also allow the slides to be sequentially presented to an audience, point-by-point and slide-by-slide, with color, animation, audio, and transition effects that enrich and enliven the presentation.

Presentations usually involve the use of visual aids such as slides. These slides contain information related to the subject of the presentation and can include text, charts, graphs and pictorial images. Many of these slides are created on computers using various computer programs. Slide presentation programs are computer programs that enable a user to create, edit, manage, and perform "presentations" on a computer. One example of a popular slide presentation program is Microsoft PowerPoint.RTM., available from Microsoft Corporation, of Redmond, Wash. Another powerful presentation tool is Lotus Freelance. A slide presentation includes a set of electronic "slides," each slide corresponding to one screen or page of output. An electronic slide may also be converted to a 35 mm slide or overhead transparency and displayed in a standard slide projector or overhead projector. Each slide contains one or more objects, such as text, graphical images, or graphical animation. A slide may also include a sound object that is played when the slide is displayed during a "slide show" performance.

A slide presentation program performs a slide show by sequentially displaying a series of slides contained within the slide presentation. The slides are displayed on a display screen, which may be part of a computer monitor or a separate surface onto which an image is projected. During a performance of a slide show, a speaker controls the performance by invoking commands to advance the slide show. A command to the slide presentation program can be entered using a keyboard, a mouse, or other suitable input device. Alternatively, an author of a slide presentation can include slide "timings" with each slide. A slide timing corresponding to a slide indicates the number of seconds that the slide is displayed before the slide presentation program automatically advances to the next slide. During a performance of a slide show, the slide presentation program automatically advances to the next slide when the existing slide's timing ends.

A slide can include one or more display objects that are incrementally displayed during a slide show. For example, a slide may initially appear with one bullet item. Sequential advancement of the slide show causes additional bullet items to be displayed Display objects, such as bullet items, that are incrementally displayed are referred to as "builds." Builds??

Presentation program resources have been developed to aid a user in developing a slide presentation. Each slide presentation contains a number of slides that display information, such as text, to an audience. In addition, each slide presentation can contain links to data (linked data) stored in an external source, such as a spreadsheet. The external source is referred to as a link source.

A link contains both a representation of the linked data and a reference to the linked data. The representation contains a static snapshot of the linked data, and as such, the representation must be updated periodically to reflect changes made to the linked data. Accessing the linked data via the reference to retrieve the latest version of the linked data performs an update. The representation is a pictorial representation, like a bitmap that describes a screen graphic, of how the linked data appeared on the computer display as of the last time the representation was updated. For example, when the linked data is a range of spreadsheet cells, the representation of the linked data would be the actual graphical depiction of the range of spreadsheet cells as it appears on the computer display. An example of a reference to linked data is a file name with a path and an indication of the specific linked data within the file. For example, the reference "C:.backslash.spreadsheets.backslash.financial.xls|A1:F1" indicates that the linked data comprises the cells "A1:F1" in the spreadsheet with the file name "financial.xls" at path "C:.backslash.spreadsheets." When the representation is displayed, the representation is displayed to the audience as an integrated part of the presentation.

Computer programs often have associated data files that are processed by the computer program during a normal execution of the computer program. A data file can contain information that is processed and presented to a user either in a video presentation or an audio presentation, or a combination of video and audio. Slide presentation programs are examples of computer programs that process an associated data file.

Many times there is a need to modify or update a presentation slide. There may be new information related to the particular subject matter in the slide. The creation of a slide presentation usually consists of generating original slides and compiling these new created slides into a new slide presentation. Although this method of slide creation has proven to be sufficient, many large organizations have personnel in different physical locations that may conduct presentations on the same or similar subjects. In addition, many of these people may be located at different geographic locations. Furthermore, one person may want to include a slide from another person's slide presentation. There may be times when persons may want to share or exchange various presentation slides. To facilitate this exchange of slides, there can be a slide repository, from which users can search the repository, select slides, and incorporate the selected slides into the user's presentation. In addition, these repositories can be located in server computer on a computing network. At the present time, the slide presentation software has constraints on a user's ability to create slide presentations by downloading slides from other locations. There can also be limitations in related to transferring the slides from one location to another location over a computer network.

In many cases, the displays may be part of a larger set of displays. This situation is often seen with presentation slides. Slide presentations can contain multiple slides that are presented in a predetermined sequence. For example, a user can assume that a server stores a repository of 1,000,000 PowerPoint slides stored in the JPEG file format. As a user attempts to create a slide presentation with slides from this repository, the user may need to navigate through a large volume of slides in order to select the ones that the user desires for the presentation. The current method to perform this task is to manually review each slide and compile a set desired slides based on the review. For each desired slide, the user would need to display the slide on a screen, copy that slide and store the copy in a slide file in another location. This method of displaying and manually copying slides is tedious and inefficient. In addition, in large repositories, the user may not be able to return to the same location in the repository they were before downloading a particular slide.

In case a hotspot on a downloaded slide points to another slide that was also downloaded, this hotspot will still be active between the downloaded slides. In case a hotspot on a downloaded slide points to another slide that was not downloaded, this hotspot will still be active, but in this case the hotspot will cause the user's WebBrowser to launch and take the user to the slide in the described repository on the network.

There remains a need for a method and system that can enable a user to efficiently create a slide repository arranged such that a user can store slides in a configuration that will enable any user to easily navigate through the slide repository and locate the desired slides for review and use. In addition, the method and system should provide for the repository to be located on a computer network and for the user to be able to load slides into the repository from a remote location.

SUMMARY OF THE INVENTION

It is an objective of the present invention to provide a method and system to create a storage repository for graphical displays at a computer network location.

It is a second objective of the present invention to provide a method and system to transfer graphical displays stored in a local database to the created storage repository.

It is a third objective of the present invention to provide a method and system to create a repository configuration such that a user can immediately determine the location of a display in the repository at any point in the search.

It is a fourth objective of the present invention to provide a method and system to convert displays stored in a local database into an html format for storage in a network repository.

It is a fifth objective of the present invention to provide a method to store a hierarchy of folders and sub-folders related to the storage of a graphical display on the network repository.

It is a sixth objective of the present invention to provide a method to assign each display an address for storage in the network repository.

The present invention provides a method and system to create a display repository that has a configuration such that a user can navigate through a repository of graphical displays and maintain the knowledge of the location of any display in the repository at any time. The purpose of the navigation activity could be to enable a user to create a slide presentation by searching, selecting, downloading and compiling slides from a central slide repository located on a computing network. A user may want to give a presentation on content that is currently on a computing network location such as a web site on the internet. The user may not feel comfortable talking about the enormous number of slides that the site might have on a particular subject. Therefore, the user would need to review the slides and select particular slides for the presentation. This review process would require a user to search through the numerous slides in the repository. This task could be tedious and would require the user to track the reviewed slides and the path of the search and review. The present invention would have the capability to display a hierarchical view of the repository that will enable the user to select the specific folder, directory, presentation set, presentation and specific display to view. With this display, the user would always know their location in the repository.

The present invention provides a method and system to create a graphical display repository at a computer network location. The present also provides for the conversion and transfer of displays stored in a local database to the network repository. The storage method of this invention will enable graphical displays to be stored in the repository such that a user can easily navigate through the repository and maintain a knowledge of their location within the repository at all times. The present invention will also produce navigation tools, in the form of buttons, that will be included on each graphical display that is shown to the user. The user will be able to select displays from a particular presentation set by selecting one of the buttons that will correspond to a set and/or a particular display.

The displays in the repository are stored such each group of displays has a specific identity and a specific location in the repository. In addition, each display in the group is identified by a specific location on the identified group where the display belongs. For any display, the group information and the specific location information would available to the user during the navigation. As a result of the knowledge of the group and sequence location, a user could determine a location of a display in the repository.

The repository created by the method and system of the present invention is a hierarchical configuration of a repository containing graphical displays. This hierarchical configuration contains a series of folders and sub-folders that are linked together. This configuration has a main folder that contains the highest level of display categories. The displays in the repository fall under one of the folder categories. Each folder has a directory with entries that describe the display categories. In this hierarchy, each entry in the main directory contains a set of sub-directories. Each of these sub-directories can contain sub-directories down to the display set presentation level.

The method of the present invention comprises developing a display presentation. This presentation involves the creation of displays by the user similar to any conventional manner. Software programs that create these presentations store these presentations in local database such as a Lotus Database. These local databases have internal structures with directories and sub-directories. Based on this internal structure, presentations and individual displays can be assigned a specific address. After assigning addresses to the individual displays, the directories containing these displays are assigned locations in the network repository.

As part of this transfer of displays from the local database to the network repository, a conversion of the displays from a local format to an html occurs to enable of the displays over the network and for storage of the displays in the network. The present invention also provides for this conversion of the displays from the local database format to the html format of the network repository.

DETAILED DESCRIPTION OF THE INVENTION

Figure 1:
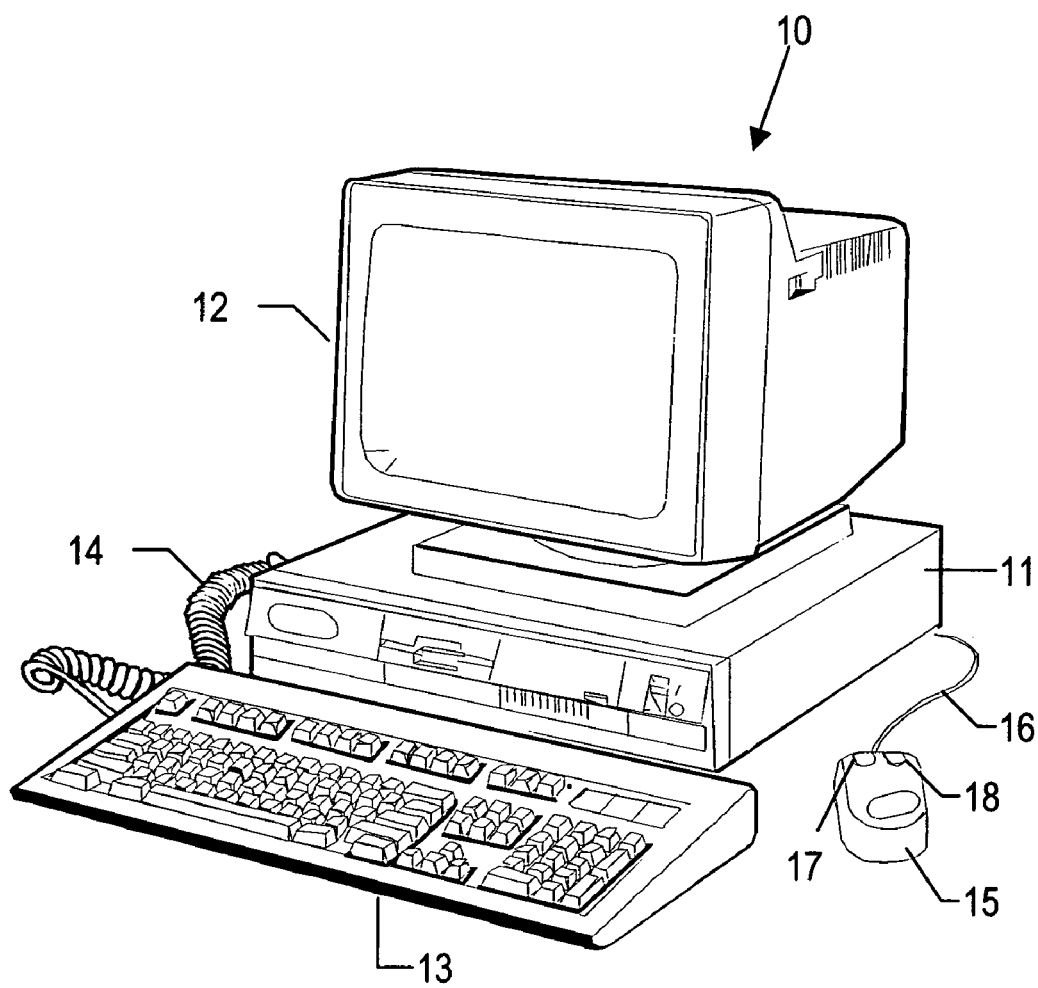
FIG. 1 depicts data processing equipment a system that can be utilized to implement the present invention.

The system of the present invention has several components, which can include: a personal computer system, a global computing network, and a browser program. With reference now to FIG. 1 and in accordance with the present invention, a slide presentation program executes on a computer, preferably a general-purpose personal computer. FIG. 1 and the following discussion are intended to provide a brief, general description of a suitable computing environment in which the invention may be implemented. With reference now to FIG. 1, there is depicted a pictorial representation of data processing system 10 which may be used in implementation of the present invention. As may be seen, data processing system 10 includes processor 11 that preferably includes a graphics processor, memory device and central processor (not shown). Coupled to processor 11 is video display 12 which may be implemented utilizing either a color or monochromatic monitor, in a manner well known in the art. Also coupled to processor 11 is keyboard 13. Keyboard 13 preferably comprises a standard computer keyboard, which is coupled to the processor by means of cable 14. Also coupled to processor 11 is a graphical pointing device, such as mouse 15. Mouse 15 is coupled to processor 11, in a manner well known in the art, via cable 16. As is shown, mouse 15 may include left button 17, and right button 18, each of which may be depressed, or "clicked", to provide command and control signals to data processing system 10. While the disclosed embodiment of the present invention utilizes a mouse, those skilled in the art will appreciate that any graphical pointing device such as a light pen or touch sensitive screen may be utilized to implement the method and apparatus of the present invention. Upon reference to the foregoing, those skilled in the art will appreciate that data processing system 10 may be implemented utilizing a personal computer.

Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The personal computer may operate in a networked environment using logical connections to one or more remote computers, such as a remote computer. The remote computer may be another personal computer, a server, a router, a network PC, a peer device or other common network node, and typically includes many or all of the elements relative to a conventional personal computer. The logical connections depicted include a local area network (LAN) and a wide area network (WAN), Such networking environments are commonplace in offices, enterprise-wide computer networks, intranets and the Internet.

As mentioned, the method of the present invention may be implemented in a global computer network environment such as the Internet. With reference now FIG. 2, there is depicted a pictorial representation of a distributed computer network environment 20 in which one may implement the method and system of the present invention. As may be seen, distributed data processing system 20 may include a plurality of networks, such as Local Area Networks (LAN) 21 and 22, each of which preferably includes a plurality of individual computers 23 and 24, respectively. Of course, those skilled in the art will appreciate that a plurality of Intelligent Work Stations (IWS) coupled to a host processor may be utilized for each such network. Any of the processing systems may also be connected to the Internet as shown. As is common in such data processing systems, each individual computer may be coupled to a storage device 25 and/or a printer/output device 26. One or more such storage devices 25 may be utilized, in accordance with the method of the present invention, to store the various data objects or documents which may be periodically accessed and processed by a user within distributed data processing system 20, in accordance with the method and system of the present invention. In a manner well known in the prior art, each such data processing procedure or document may be stored within a storage device 25 which is associated with a Resource Manager or Library Service, which is responsible for maintaining and updating all resource objects associated therewith.

Figure 2:
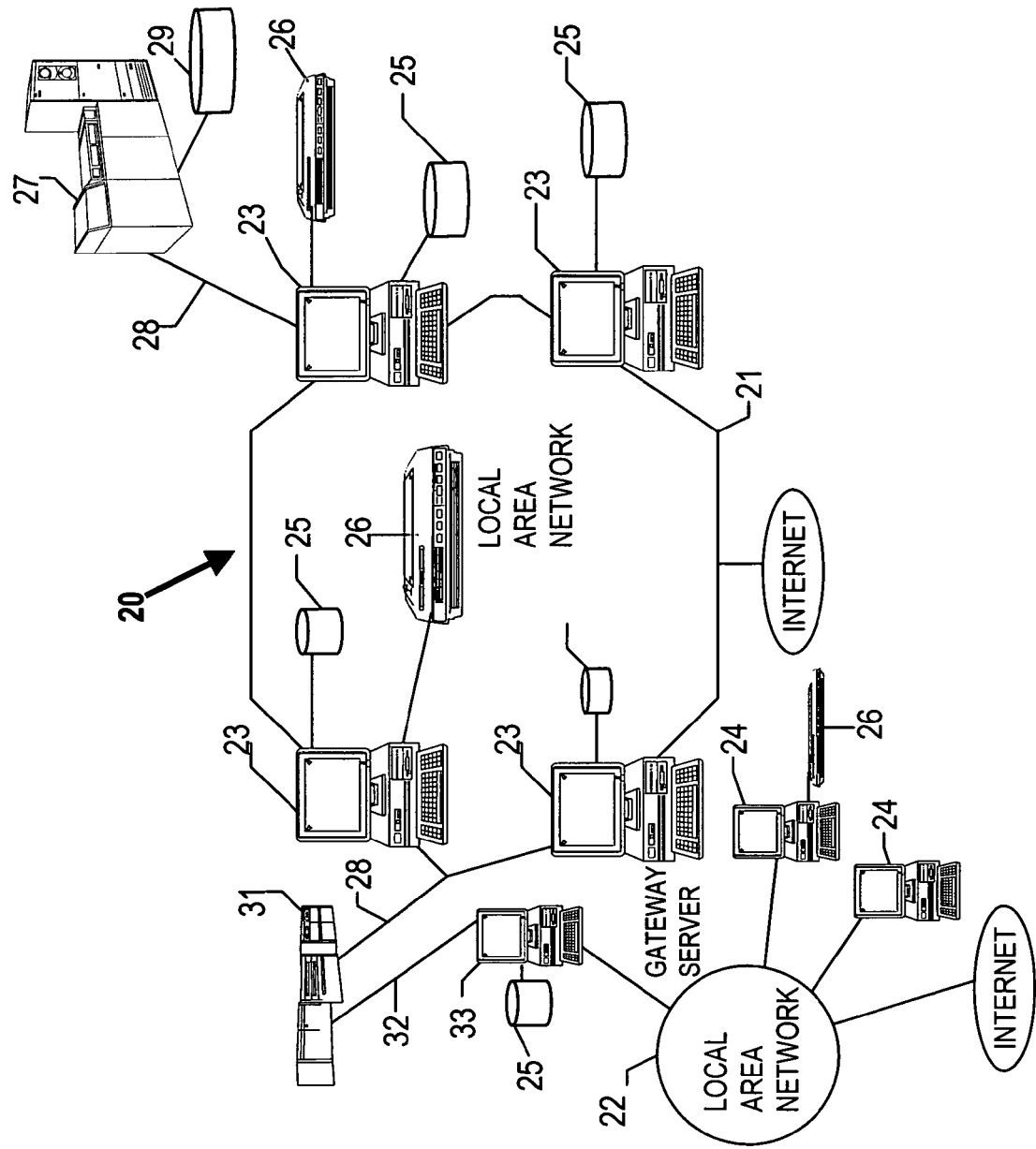
FIG. 2 is a diagram of a computer network over which messages and transactions may be transmitted.

Still referring to FIG. 2, it may be seen that distributed data processing system 20 may also include multiple mainframe computers, such as mainframe computer 27, which may be preferably coupled to Local Area Network (LAN) 21 by means of communications link 28. Mainframe computer 27 may also be coupled to a storage device 29 which may serve as remote storage for Local Area Network (LAN) 21. A second Local Area Network (LAN) 22 may be coupled to Local Area Network (LAN) 21 via communications controller 31 and communications link 32 to a gateway server 33. Gateway server 33 is preferably an individual computer or Intelligent Work Station (IWS) that serves to link Local Area Network (LAN) 22 to Local Area Network (LAN) 21. As discussed above with respect to Local Area Network (LAN) 22 and Local Area Network (LAN) 21, a plurality of data processing procedures or documents may be stored within storage device 29 and controlled by mainframe computer 27, as Resource Manager or Library Service for the data processing procedures and documents thus stored. Of course, those skilled in the art will appreciate that mainframe computer 27 may be located a great geographical distance from Local Area Network (LAN) 21 and similarly Local Area Network (LAN) 21 may be located a substantial distance from Local Area Network (LAN) 24. That is, Local Area Network (LAN) 24 may be located in California while Local Area Network (LAN) 21 may be located within Texas and mainframe computer 27 may be located in New York.

Figure 3:
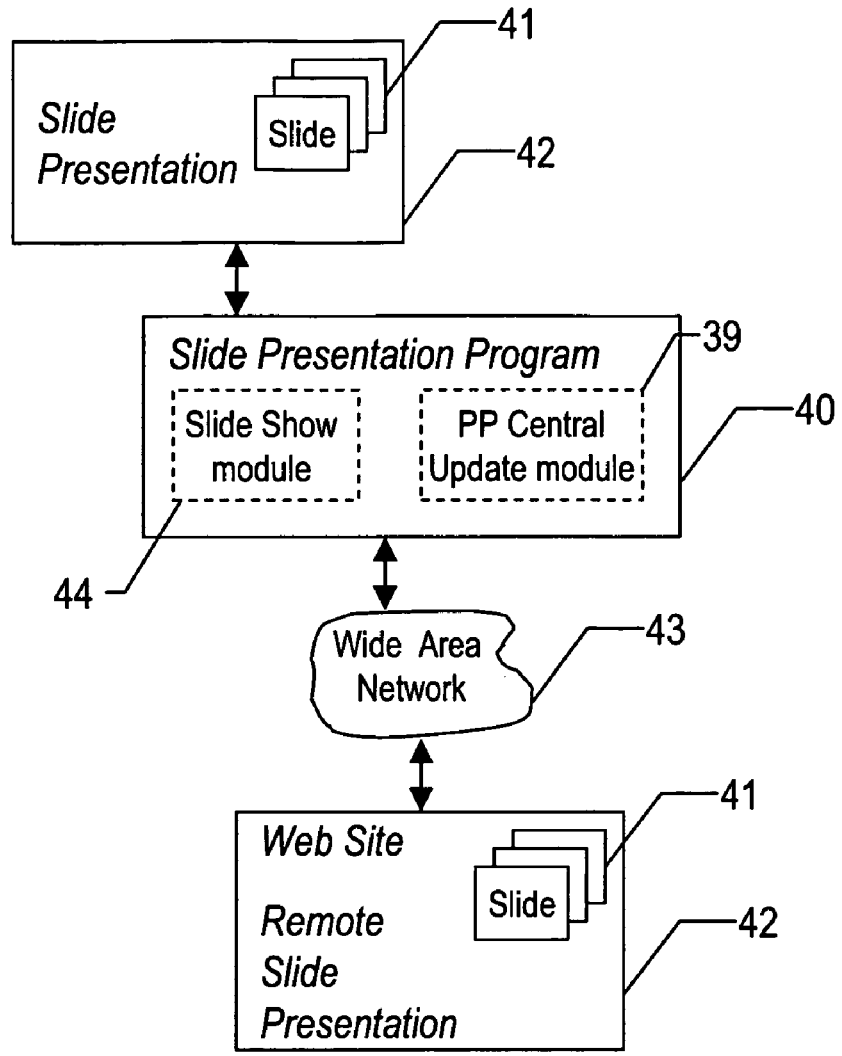
FIG. 3 is a diagram of the architecture of a typical slide presentation program.

Although the present invention can apply to the search for any type of display, the techniques of this invention will be described in the context of slide presentations. Referring first to FIG. 3, there is an illustration of an architecture of a slide presentation program 40 that can be used in conjunction with the present invention. A slide is a discreet collection of information, including visual information such as text, graphic images, video, or animation. A slide may also comprise other information, including sounds and interactive information, such as hyperlinks. The slide presentation program 40 provides an author with the ability to create and edit a set of one or more "slides" 41 and to "present" or display one or more of the set of slides. The set of slides is referred to as a "slide presentation" 42. A slide presentation 42 is generally stored on a computer storage medium, such as a disk drive. The computer storage medium may be directly connected to the computer that performs a sideshow, or it may be connected to a remote computer on a local area network (LAN) or a wide area network (WAN) 43, such as the Internet.

The slide presentation program 40 includes a slide show module 44 that contains program code for controlling an electronic slide show. During an electronic slide show, the slide show module 44 retrieves a slide 41 and displays the slide on an output medium, such as a display monitor. The slide presentation program 40 also includes a PPCentral update module 39 that controls updating of the Central slide presentation 42. The techniques and features of the present invention could be located in the Central update module 39.

Figure 4:
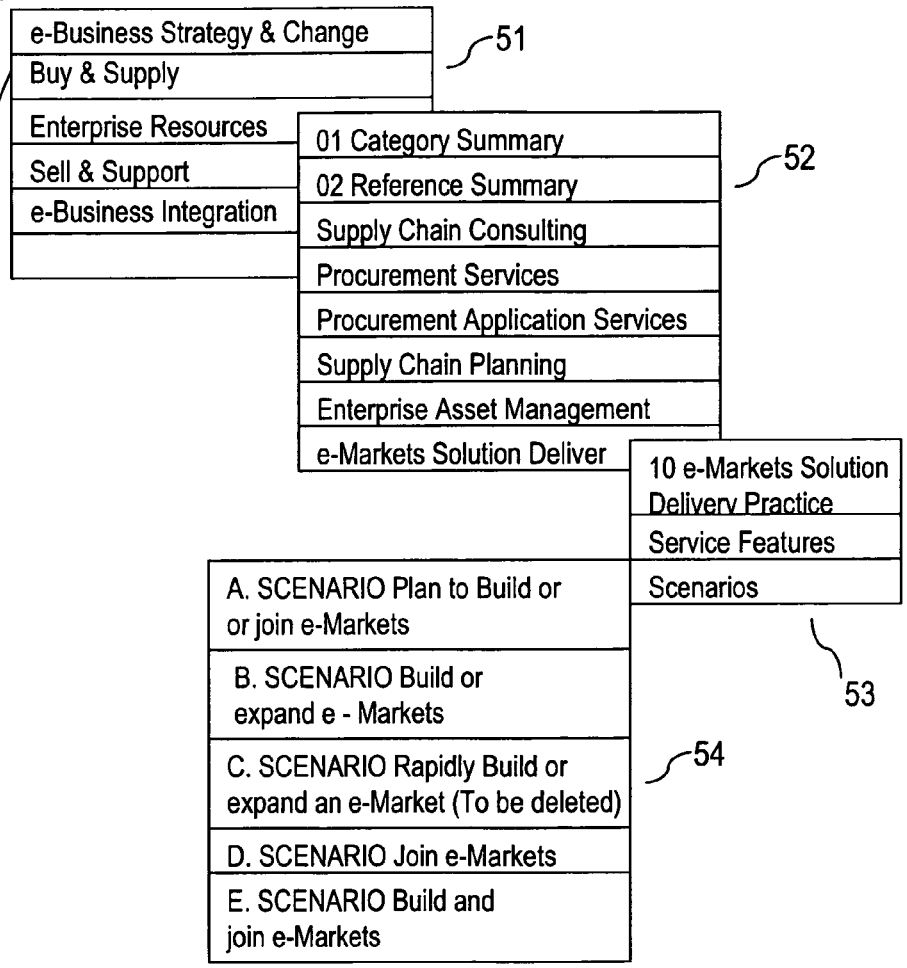
FIG. 4 is a diagram of a configuration of displays stored in a repository in accordance with the present invention.

FIG. 4 shows a hierarchical configuration of a repository containing graphical displays. As shown, this hierarchical configuration has a main folder 50. This folder contains the highest level of display categories. The displays in the repository fall under one of the folder categories. Each folder has a directory 51 with entries that describe the display categories. In this hierarchy, each entry in the main directory 51 contains a set of sub-directories 52. Each of these sub-directories contains a sub-directory 53. In FIG. 4, sub-directory 53 contains entries that are display set categories. These categories 54 are the locations for sets of displays. Each display in a set contains multiple graphical displays.

The description of the present invention will be done in the context of the graphical display being presentation slides. The local database for this description will be the Lotus Notes Database. However, the techniques of the present invention can apply in the present or a modified form to any graphical displays stored in a repository. Referring to the main folder 50, display category 55 has the title "Buy and Sell". The display categories are actually directories. Each directory has links to a set of sub-directories 52. A directory can have fields containing pointers to the various sub-directories under that directory. For example, the Buy and Sell directory 55 links to eight sub-directories 53. These sub-directories have various titles that describe the contents of these sub-484 directories. Selecting the sub-directory titled "e-Market Solution Delivery" has links to yet another set of sub-directories. In this particular illustration, by selecting one of the entries in this last set of sub-directories 54, the user has reached the lowest point of the sub-directory hierarchy. At this point, the user can identify a particular slide location to place the slide or slide presentation.

Figure 5:
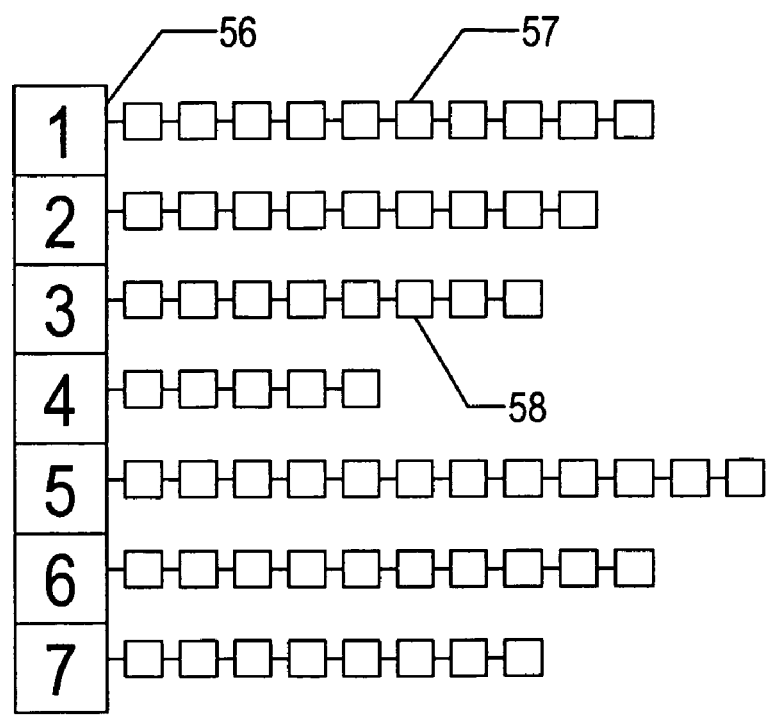
FIG. 5 is an illustration of a display repository directory.

FIG. 5 illustrates a storage configuration for slide presentation in a slide repository. This configuration will enable a user to navigate through the slide repository in accordance with techniques described in a co-pending patent application of the same applicants of this invention, the contents of which are incorporated herein by reference. As shown, this configuration is a grid-type configuration that has a column 56 containing sets of slide presentations. Each slide presentation will have an identifier that points to a specific location in the repository. The illustration in FIG. 5 shows seven different slide presentations. Each slide presentation contains several slides 57. These slides are stored sequentially in the order that they would appear during an actual slide presentation. As shown, the number of slides in each presentation will vary. In addition, each slide will have an identifier that will indicate the slide presentation in which that slide belongs and the number of that slide in the sequence of slides in that presentation. In FIG. 5, slide 58 is the sixth slide in the third slide presentation. Therefore, this slide could have an identifier that has two fields to identify the particular slide. One field could contain a 3 indicating the third slide presentation. A second field could contain a 6 indicating the sixth slide in that presentation. Although each slide would some type of identifier, this information would generally not be accessible to the user.

As previously mentioned, the techniques of the present are described in the context of a local database referred to as Lotus Notes. With reference to this database, the method and system of the present invention takes Microsoft PowerPoint presentations residing in a Lotus Notes database and converts them into a Web HTML format. This conversion includes any hotspots that had been defined on the slides. Each slide is given a unique HTML filename that can be linked to from any other slide.

Figure 6:
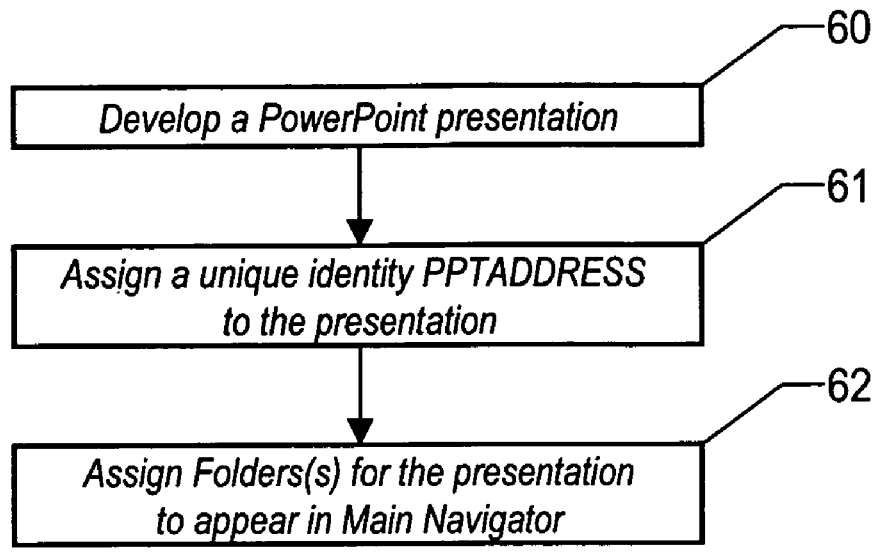
FIG. 6 is a flow diagram of the main steps in the implementation of the present invention.

Referring to FIG. 6, there is a flow diagram of the main steps in the method of the invention. Step 60 is the development of the PowerPoint presentation using the convention PowerPoint software. The software for the Lotus Notes database stores the presentation in a structure that comprises directories and sub-directories. Step 61 converts the PowerPoint presentation into a HTML format. During this conversion, the slides are assigned a unique identity and address. Step 61 converts the folder structure for the local database into an HTML format for storage in the network repository. These folders will appear in the repository hierarchical configuration shown in FIG. 4.

Figure 7:
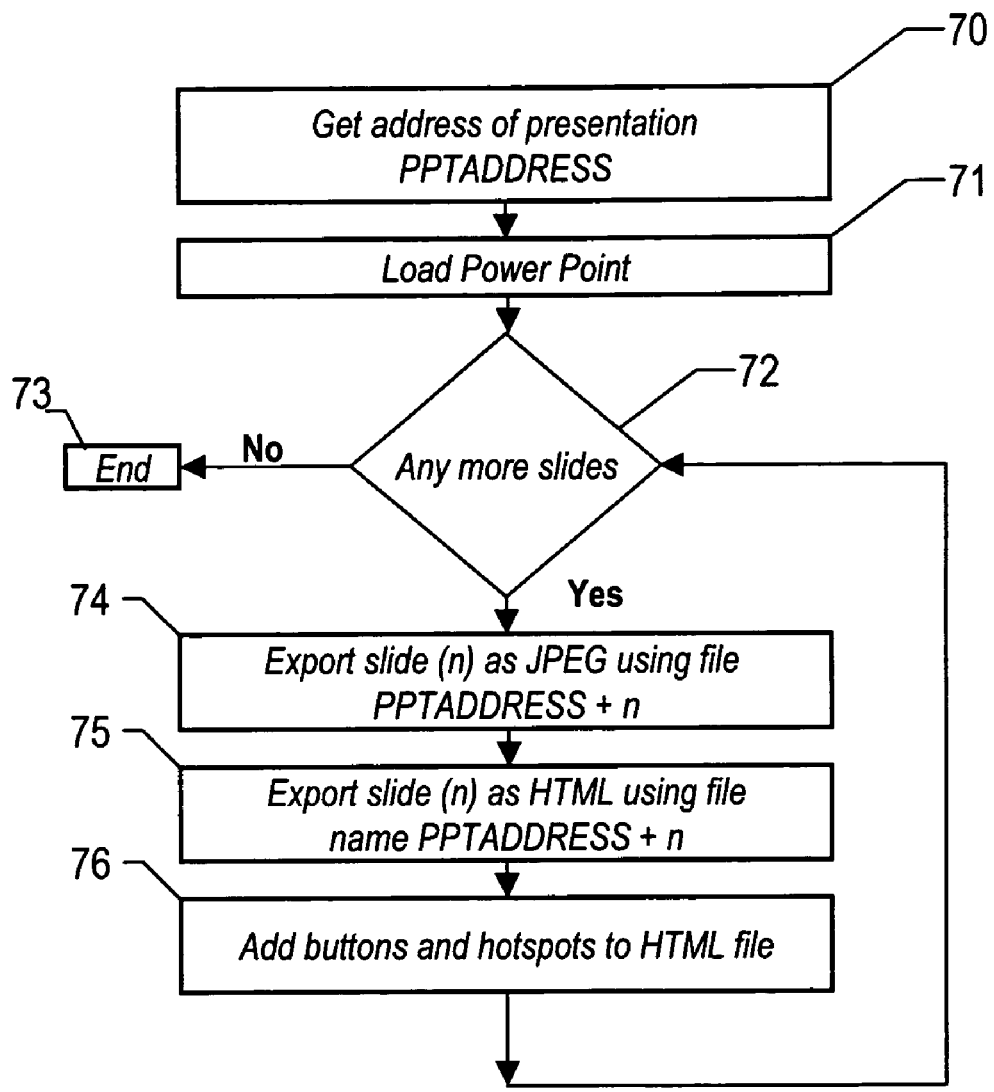
FIG. 7 is a flow diagram of the method of the present invention to convert graphical displays from a local database format into an HTML format.

FIG. 7 is a flow diagram of the conversion of a PowerPoint slide in a presentation into an HTML format for transfer and storage in the slide repository shown in FIG. 6 as step 61. In this process, step 70 gets the previously assigned address of the presentation designated by the user to be stored in the network repository. The slides are sequentially assigned an address that indicates the presentation to which the slide belongs. Step 71, loads this presentation into the HTML conversion software. Step 72 counts the number of slides to be converted and determines whether there are any more slides in the file for conversion. When all of the slides in the presentation have been converted to html, the method moves to the end step 73. In step 74, the slides are sequentially converted first into a JPEG format, which is an image compression format for the purpose of transferring the slide over a medium such as a computing network. The files are exported in step 74, from the Lotus Notes database as JPEG files using the file name of the slide plus the number of the slide in the set of designated for transfer. The files have names with the notation PPTADDRESS+n. This notation indicates that the slide is a PowerPoint slide having the previously assigned address and slide sequence number designated by "n". These slide files contain a larger JPEG slide display and a small thumbnail slide display. The thumbnail display is important for searching for slides stored in the network repository. In step 75, the HTML conversion software receives the exported file and converts the slides into an HTML format and assigns the files an address for storage in the network repository. In step 76, each converted HTML presentation is processed such that the slide will display navigation buttons to enable the user to access the slide from the network configuration hierarchy. In this process, the HTML file knows about all of the slides in the presentation and produces a set of horizontal buttons. Each button represents a corresponding slide in the presentation. In addition, a set of popup thumbnails for each button is generated. As the curser moves over a specific button, the popup thumbnail for that slide will appear on the screen. The slide HTML also knows about the first and second slides in each of the other presentations in the group of presentations. A set of vertical buttons is produced that correspond to each presentation in the group as shown in FIG. 5. For the vertical buttons, the thumbnail represents the first slide, cover page, and when a user clicks, it activates the second slide and skips the cover page in order to quickly go to the content of the presentation.

Figure 8:
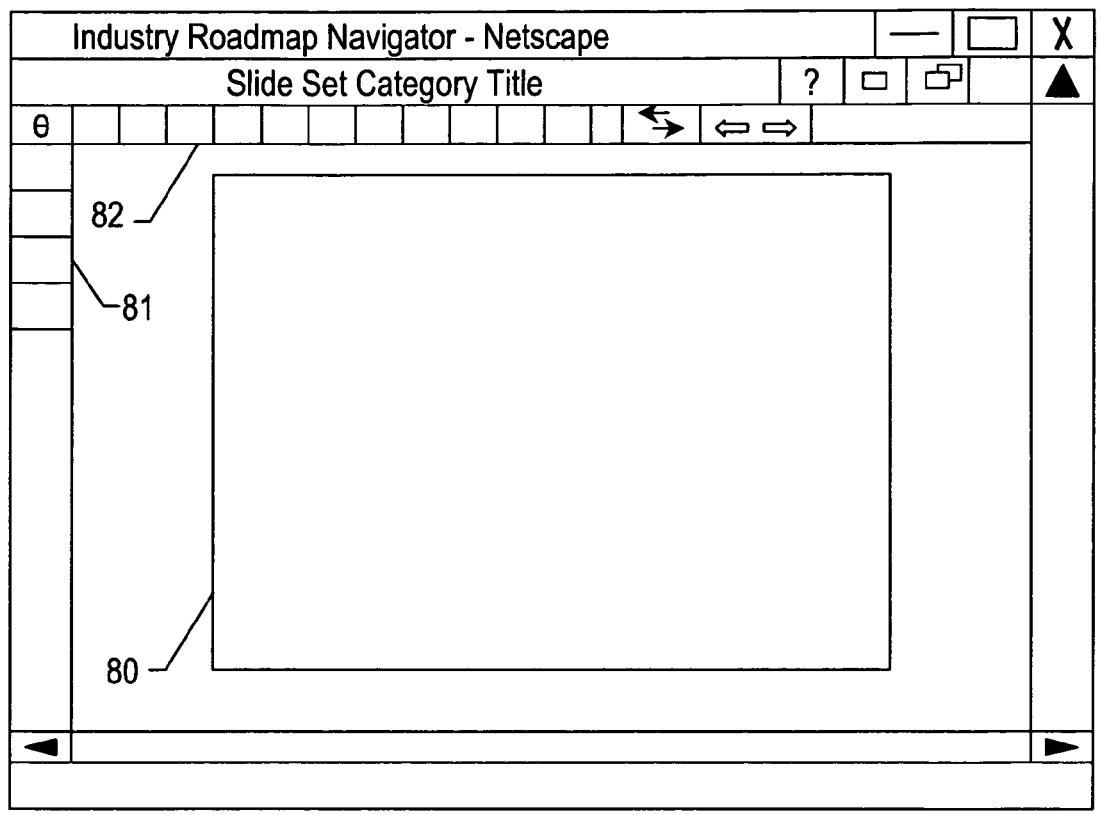
FIG. 8 is an illustration of an actual display stored in a repository according the present invention.

FIG. 8 shows an actual graphical display in accordance with the present invention. As shown the display contains substantive information 80. However, the display also contains vertical control buttons 81 and horizontal control buttons 82 that will enable a user to select a display for viewing. With these sets of buttons, a user can move from display to display by clicking the particular buttons. The vertical buttons control the selection of the display presentation such as a slide presentation. The horizontal buttons control the selection of a particular display in the presentation.

Figure 9:
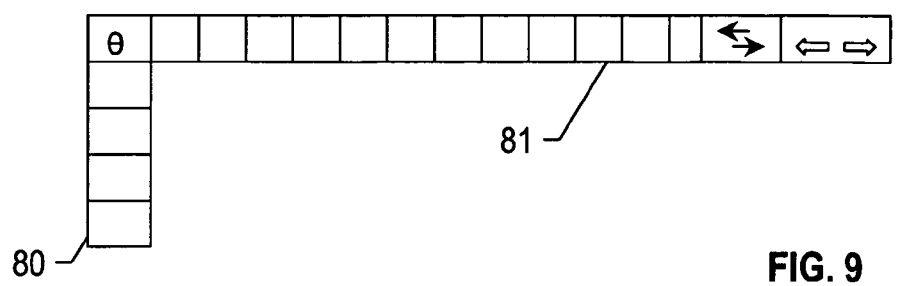
FIG. 9 is a diagram of the navigating display used during the navigation through the display repository.

FIG. 9 shows the particular vertical and horizontal controls that appear on each display that enable a user to search through and select a particular slide. As shown, there is a column of buttons 60 that correspond to the number of slide presentations in a particular sub-directory. A row of buttons 81 corresponds to the number of slides in a particular slide presentation. Referring to FIG. 5, there would be seven buttons in the column indicating seven slide presentations in this sub-directory. For the third slide presentation, there would be 8 buttons in the row 81. Each button would correspond to the particular slide in the sequence. If the user wanted to view the sixth slide 57, the user could click the sixth button and this sixth slide would appear on the display. If the user wants to view another slide on a different presentation, the user can click the button in the column for that particular presentation and then click the button in the row that corresponds to the particular slide, which the user wants to view. The buttons corresponding to the slide presentation and the specific slide will be lit to indicate to the user the actual slide that the user is viewing.

Figure 10:
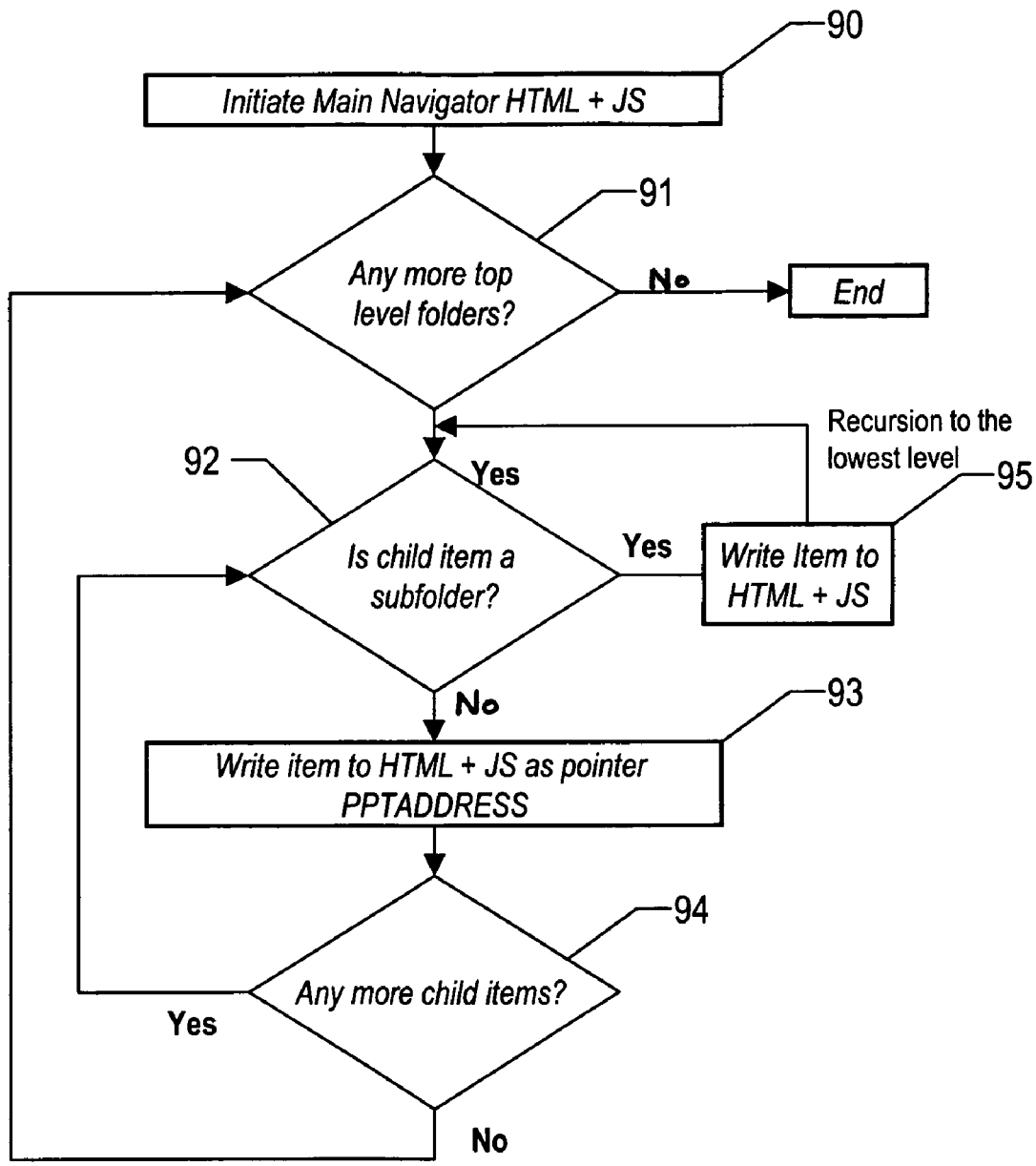
FIG. 10 is a flow diagram of the of the method of the present invention to convert folders arranged in a local database to the format and location where these folders will appear in a display of a network repository hierarchy display.

FIG. 10 method to convert folders arranged in a local database to the format and location where these folders will appear in a display of a network repository hierarchy display. This conversion will result in a cascading menu down to the presentation and slides. In this conversion, it is preferable to use both HTML and JavaScript to produce the cascading menus. In step 90, the HTML and Java files are opened for writing. The original PowerPoint presentations have been put the presentations in folders. These folders are made in a Lotus Notes database and are similar to well known folders on a hard drive. These folders are also made as a hierarchy, which is similar to the network repository configuration. In step 91, each of the top level folders is scanned for subfolders by recursion. This process is repeated in steps 92, 93, 94 and 95 all the way down to the lowest level. Every folder is written to HTML+JavaScript as a menu item that takes the user to another submenu. This process will also display the path taken by the user through the different menus and sub-menus as shown in FIG. 4.

It is important to note that while this invention was described in the context of slides as displays and slide presentations as display presentations, the repository creation and storage techniques and the navigations concepts and techniques of this invention can apply to any graphical displays stored in a repository in the configuration of a display repository illustrated in the present invention. It is also important to note that while the present invention has been described in the context of a fully functioning data processing system, those skilled in the art will appreciate that the processes of the present invention are capable of being distributed in the form of instructions in a computer readable medium and a variety of other forms, regardless of the particular type of medium used to carry out the distribution. Examples of computer readable media include media such as EPROM, ROM, tape, paper, floppy disc, hard disk drive, RAM, and CD-ROMs and transmission-type of media, such as digital and analog communications links.

Having thus described the invention, what we claims as new and desire to secure by Letters Patent is set forth in the following claims.

We claim:

1. A method for creating a storage repository for storing graphical displays in a computer network environment comprising the steps of:
   receiving a file containing graphical displays stored in a local database, said local database storing the graphical displays in a folder directory hierarchy configuration;
   converting the file containing the graphical displays into an HTML format;
   converting the folders containing the graphical displays into a format for inclusion in a network repository, by performing:
      receiving a hierarchical directory containing the display file and displays as created during the initial creation the display file,
      determining the number of top level folders in this hierarchy,
      determining the number of sub-folders in the hierarchy, and
      writing an item to the network repository, when the lowest level of sub-folder has been reached; and
   storing the converted folders in the network repository such that the stored folders form a hierarchy of folders, directories and subdirectories.

2. The method as described in claim 1 wherein said file conversion step further comprises the step of assigning a unique identity to each graphical display in a file.

3. The method as described in claim 2 wherein said unique identity could be an address for the graphical display.

4. The method as described in claim 3 wherein said file conversion step further comprises the steps of:
getting an address of the file containing the graphical displays;
determining the number of displays in a file; exporting a file in a compressed format for conversion to an HTML format;
converting the graphical displays in the file into an HTML format; and
adding navigation tools to each display, said navigation tools having buttons that correspond to each display in a file and each file in a group.

5. The method as described in claim 4 further the step of returning to said exporting step and repeating said exporting step for each display in the file.

6. The method as described in claim 4 further comprising the step of terminating said file-converting step when the determination is that no more displays are in the file.

7. The method as described in claim 5 wherein said exporting step further comprises exporting one large display in a compressed format and one small thumbnail view of the display in a compressed format.

8. The method as described in claim 4 wherein said compressed format is a JPEG format.

9. The method as described in claim 1 wherein said writing step further comprises writing a pointer to the address of a display in the network repository.

10. The method as described in claim 1 wherein said pointer is an HTML+Javascript pointer to a network repository address.

11. The method as described in claim 1 further comprising the step of writing each sub-folder in the hierarchy into the network repository as part of a cascading menu for the display file.

12. A computer program product in a computer readable medium for creating a storage repository for storing graphical displays in a computer network environment comprising the steps of:
instructions for receiving a file containing graphical displays stored in a local database, said local database storing the graphical displays in a folder directory hierarchy configuration;
instructions for converting the file containing the graphical displays into an HTML format;
instructions for converting the folders containing the graphical displays into a format for inclusion in a network repository, said folder converting instructions performing:
receiving a hierarchical directory containing the display file and displays as created during the initial creation the display file,
determining the number of top level folders in this hierarchy,
determining the number of sub-folders in the hierarchy, and
writing an item to the network repository, when the lowest level of sub-folder has been reached; and
instructions for storing the converted folders in the network repository such that the stored folders form a hierarchy of folders, directories and subdirectories.

13. The computer program product as described in claim 12 wherein said file conversion instructions further comprise instructions for assigning a unique identity to each graphical display in a file.

14. The computer program product as described in claim 13 wherein said file conversion instructions further comprise:
instructions for getting an address of the file containing the graphical displays; instructions for determining the number of displays in a file;
instructions for exporting a file in a compressed format for conversion to an HTML format;
instructions for converting the graphical displays in the file into an HTML format; and
instructions for adding navigation tools to each display, said navigation tools having buttons that correspond to each display in a file and each file in a group.

15. The computer program product as described in claim 14 further comprising instructions for returning to said exporting instructions for each display in the file.

16. The computer program product as described in claim 14 further comprising the instructions for terminating said file converting instructions when the determination is that no more displays are in the file.

17. The computer program product as described in claim 15 wherein said exporting instructions further comprise instructions for exporting one large display in a compressed format and one small thumbnail view of the display in a compressed format.

18. The computer program product as described in claim 12 wherein said writing instructions further comprise instructions for writing a pointer to the address of a display in the network repository.

19. The computer program product as described in claim 12 further comprising instructions for writing each sub-folder in the hierarchy into the network repository as part of a cascading menu for the display file.

20. A system for creating a storage repository for storing graphical displays in a computer network environment comprising:
a local computer machine;
a network repository for storing and displaying graphical displays;
a conversion program for converting display files into HTML formats for inclusion in the network repository performing:
receiving a hierarchical directory containing the display file and displays as created during the initial creation the display file,
determining the number of top level folders in this hierarchy,
determining the number of sub-folders in the hierarchy, and
writing an item to the network repository, when the lowest level of sub-folder has been reached;
a computer network for establishing communication between said local computer and said display repository;
a program that generates a cascading menu containing the folders, directories and, graphical displays in the network repository; and
a display file-generating program for assembling a display file from displays stored in a display file repository.

21. The system as described in claim 20 further comprising a program for producing control tools on a graphical display.

* * * * *